(12) United States Patent
Moore et al.

(10) Patent No.: US 9,071,503 B2
(45) Date of Patent: Jun. 30, 2015

(54) HIGHLY SCALABLE OSPF ROUTING IN SUPPORT OF FULL MESH OPTICAL NETWORKS

(75) Inventors: Brian Moore, Stittsville (CA); Craig Parker, Kanata (CA)

(73) Assignee: CIENA CORPORATION, Hanover, MD (US)

( * ) Notice: Subject to any disclaimer, the term of this patent is extended or adjusted under 35 U.S.C. 154(b) by 303 days.

(21) Appl. No.: 12/910,957

(22) Filed: Oct. 25, 2010

(65) Prior Publication Data

US 2012/0099858 A1 Apr. 26, 2012

(51) Int. Cl.
*H04L 12/28* (2006.01)
*H04L 12/751* (2013.01)
*H04L 12/715* (2013.01)

(52) U.S. Cl.
CPC ............... *H04L 45/02* (2013.01); *H04L 45/04* (2013.01)

(58) Field of Classification Search
USPC ......... 370/254, 255, 256, 400, 401, 402, 403, 370/404, 405, 406
See application file for complete search history.

(56) References Cited

U.S. PATENT DOCUMENTS

| | | | |
|---|---|---|---|
| 7,352,692 B1* | 4/2008 | Saleh et al. ................... | 370/216 |
| 2002/0097671 A1* | 7/2002 | Doverspike et al. .......... | 370/216 |
| 2006/0262735 A1* | 11/2006 | Guichard et al. ............. | 370/254 |
| 2009/0073996 A1* | 3/2009 | Swallow et al. .............. | 370/401 |

* cited by examiner

*Primary Examiner* — Alvin Zhu
(74) *Attorney, Agent, or Firm* — Kent Daniels; Daniels IP Services Ltd.

(57) ABSTRACT

A method for enabling Open Shortest Path First (OSPF) routing in a transport network. The method comprises defining a network segment template; instantiating a respective network segment template for each node+link segment of the transport network; and connecting the link area of a first template instance to the node area of a second template instance using a remote ABR. The network segment template comprises a node area for enabling OSPF routing between addresses within a node of the transport network; a link area for enabling OSPF routing between the node and an adjacent neighbor node in the transport network; and a host Area Boarder Router (ABR) connected to the node area and the link area. The host ABR is configured to generate summary Link State Advertisement (LSA) messages containing a summary of addresses in the node area, and forward the summary LSA messages through the link area. The remote ABR is configured to generate summary LSA messages containing a summary of addresses reachable in the node area of the second template instance, and forward the summary LSAs through the link area of the first template instance.

12 Claims, 3 Drawing Sheets

HIGHLY SCALABLE OSPF ROUTING IN SUPPORT OF FULL MESH OPTICAL NETWORKS

FIELD OF THE INVENTION

The present invention relates to communication networks, and in particular to a network segment template that can be used to form a highly scalable Open Shortest Path First (OSPF) routing in support of full mesh optical networks.

DESCRIPTION OF THE PRIOR ART

In the modern communications network space, high-speed Wide Area Networks (WANs) have typically been deployed having a ring architecture and utilizing provisioned routes over a synchronous data transport protocol such as Synchronous Optical Network (SONET) or Synchronous Data Hierarchy (SDH). These systems were popular because they combine high data capacity and reliability, with built-in high-speed protection switching functions. However, it has been found that the ring architecture is relatively inflexible, which impedes expansion of the network as customer demands change and increase. Consequently, network operators have been migrating towards a mesh architecture in the WAN.

A difficulty with mesh networks is computing an optimal route between any given Source Address (SA) and Destination Address (DA) in the network. This problem is normally addressed using a link-state routing protocol, such as Open Shortest Path First (OSPF).

In Link-state routing protocols, each node maintains a local topology database defining the node's view of the current network topology. When the node detects a change in the network topology, it updates its topology database, and generates a link-state advertisement (LSA) containing information of the topology change. This LSA is then sent to each of its neighbour nodes in the network. Upon receipt of the LSA, each neighbour node updates its local topology database, and then sends the LSA on to each of its neighbour nodes in the network. By means of the flooding of LSAs through the network, each node becomes aware of topology changes, and can thereby synchronise its local topology database with that of every other node in the network. Various known route computation algorithms, such as Djykstra, can use the local topology databases in each node to compute an optimal route through the network. Each node traversed by the computed route can then install forwarding state in a local forwarding table, such that the node can properly forward received data packets to the next hop of the route towards the DA.

A limitation of this approach is that as the number of nodes in the network increases, the size of the local topology database and forwarding table in each node increases dramatically, as does the number of LSAs being flooded into the network. This tends to degrade system performance, in terms of the time required to achieve synchronization after a topology change, the time required to compute an optimal route through the network, and the time required for the node to determine the next hop for any given data packet.

This issue is normally addressed by implementing a hierarchical routing scheme of the type illustrated in FIG. 1. As may be seen in FIG. 1, the network 2 is divided or partitioned into a plurality of Autonomous Systems (ASs) 4, each of which comprises one or more Areas 6. Each Area 6, encompasses a set of nodes 8 (referred to as interior routers, IRs) and interconnecting links 10. Each area 6 is hosted by Area Border Router (ABR) 12, which is connected to ABRs hosting other areas via links within a back-bone area 6a of the AS 4. Finally, each AS 4 is hosted by an Autonomous System Border Router (ASBR) 14, which is connected to the respective ASBRs hosting other ASs 4 via a data network 16 such as the Internet.

With this arrangement, the flooding of LSAs from a given node is constrained to the area 6 in which that node is located. Thus, for example, in Area 0.0.0.1 6b of FIG. 1, LSAs sent by each IR 8 within that area will be constrained to Area 0.0.0.1 6b itself, and its host ABR 12a. IRs 8 within Area 0.0.0.2 6c, for example, will not receive these LSAs.

In order to facilitate computation of routes between different areas 6, the ABRs 12 generate route summary information containing a summary or digest of addresses reachable in its area 6, and then floods this information to other ABRs 12 through the backbone area 6a. Thus, for example, in AS1 4a of FIG. 1, ABR-1 12a hosts areas 0.0.0.1 and 0.0.0.2, 6b and 6c. Accordingly, ABR-1 12a will generate route summary information for each of these areas, which contains a summary or digest of addresses reachable in each area. This route summary information can be used to update its own local forwarding table(s), and thereby enable computation of routes that have respective endpoints in each of these areas. In addition, ABR-1 can flood LSAs into the back-bone area 6a which contain (or update) the route summary information. ABR-2 12b will thus receive these LSA, and so can update its forwarding tables and thereby facilitate computation of routes having an endpoint in Area 0.0.0.3 6d and either of the areas 6b-c hosted by ABR-1 12a.

Route summary LSAs sent by the ABRs 12 within AS1 4a will also be received by the ASBR 14a hosting the AS, which can then exchange this information, via the data network 16, with the ASBRs 14 hosting other ASs using, for example, Border Gateway Protocol (BGP) and thereby enable computation of routes having endpoints in different ASs 4.

An advantage of this hierarchical routing scheme is that it limits the scope of LSA flooding, and the size of both the local topology database and the forwarding table in each node 8, 12 14 of the network 2. However, it suffers a limitation in that the design of each AS 4 necessarily proceeds from a set of assumptions about the size of the network 2, the amount of traffic in any given geographical region, and anticipated future changes in traffic demand. Once the AS design has been developed and the AS 4 implemented in the network, significant re-engineering of the AS 4 (for example to address unanticipated changes in traffic distribution or demand) can be very difficult, and consequently expensive.

What is needed is a highly scalable technique that enables route computation in a full mesh network, and which can accommodate unanticipated changes in traffic load or demand without requiring re-engineering of previously implemented routing domains.

SUMMARY

Accordingly, an aspect of the present invention provides a method for enabling Open Shortest Path First (OSPF) routing in a transport network. The method comprises defining a network segment template; instantiating a respective network segment template for each node+link segment of the transport network; and connecting the link area of a first template instance to the node area of a second template instance using a remote ABR. The network segment template comprises a node area for enabling OSPF routing between addresses within a node of the transport network; a link area for enabling OSPF routing between the node and an adjacent neighbour node in the transport network; and a host Area Border Router (ABR) connected to the node area and the link area. The host ABR is configured to generate summary Link State Advertisement (LSA) messages containing a summary of addresses in the node area, and forward the summary LSA messages through the link area. The remote ABR is configured to generate summary LSA messages containing a summary of addresses reachable in the node area of the second template instance, and forward the summary LSAs through the link area of the first template instance.

BRIEF DESCRIPTION OF THE DRAWINGS

The features of the invention will become more apparent in the following detailed description in which reference is made to the appended drawings wherein.

It will be noted that throughout the appended drawings, like features are identified by like reference numerals.

DETAILED DESCRIPTION

Figure 1:
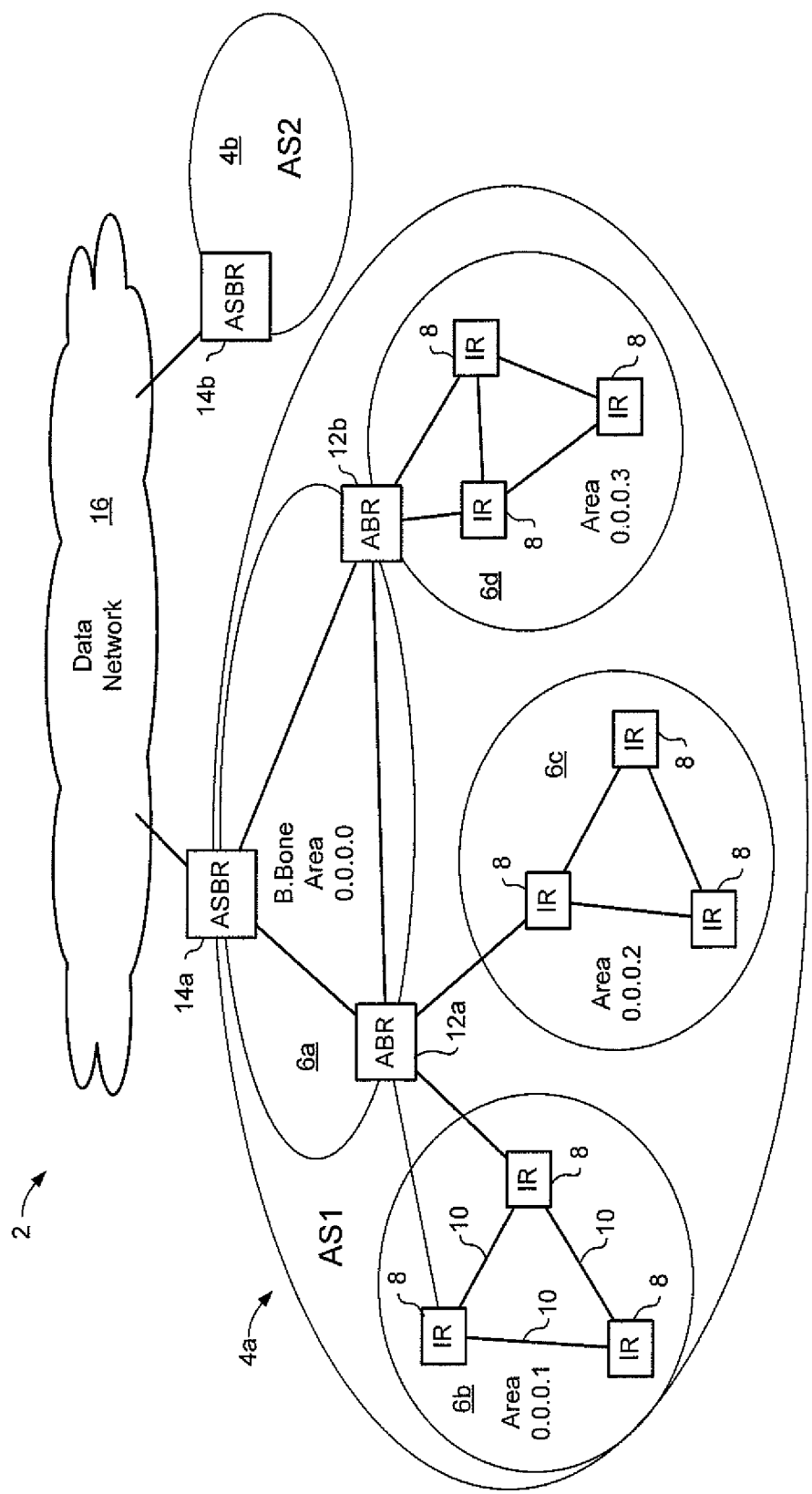
FIG. 1 is a block diagram schematically illustrating an conventional OSPF network.

In very general terms, embodiments of the present invention provides a network segment template or primitive, which defines OSPF routing within a network segment comprising a single node and a single link extending from that node. Instances of this template can be implemented as desired to encompass any desired number of nodes and links in the network, and thereby facilitate route computation across the network, without the need for a hierarchical scheme such as that described above in reference to FIG. 1. FIG. 2 illustrates principal elements of a network segment template in accordance with a representative embodiment of the present invention.

Figure 2A:
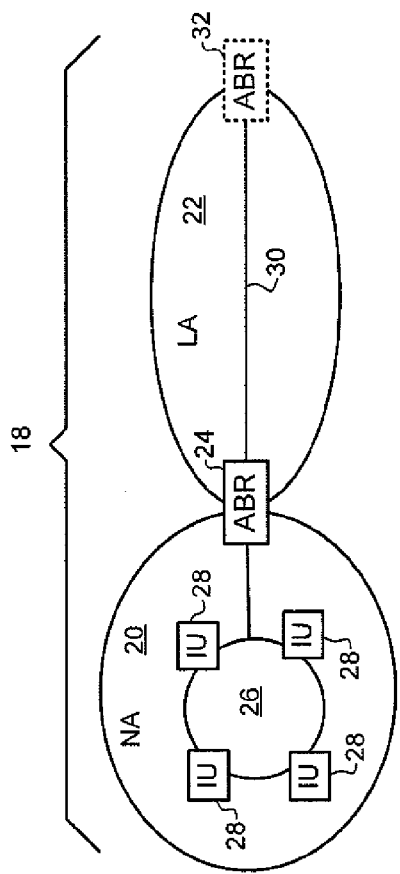
FIGS. 2a and 2b are block diagrams schematically illustrating elements of a network segment template in accordance with representative embodiments of the present invention.

Referring to FIG. 2a, a the network segment template 18 comprises two OSPF areas, a Node Area (NA) 20 and a Link Area (LA) 22 that are connected by a host ABR 24. The Node Area 20 encompasses a single network node 26, which normally comprises a plurality of interface units (IUs) 28 interconnected via an Ethernet Local Area Network (LAN), for example. In some embodiments, the network node 26 may be provided as a reconfigurable optical add-drop multiplexer (ROADM), and each IU 28 may be a shelf of the ROADM, although this is not essential. Other configurations of the node 26 may be used as desired. In some embodiments, the functionality of the host ABR 24 may reside on one of more of the UIs 28 of the Node Area 20. The Link Area 22 encompasses a single link 30 extending from the network node 26 to an adjacent neighbour node of the network. In some embodiments, the Link Area 22 includes the neighbour node, but this is not essential. In some embodiments, the Link Area 22 includes a remote ABR 32 (shown in dashed line) for connecting Link Area 22 to an adjacent OSPF area encompassing the neighbour node. However, this is not essential. In other embodiments, the remote ABR 32 may not be a formal part of the template 18, but rather may be instantiated as required to connect adjacent template instances together during deployment of a routing network. In either case, the functionality of the remote ABR 32 may reside on one or more of the IUs of the neighbour node.

Each IU 28 may be represented in the template 18 as an OSPF Internal Router (IR), and so operate to generate and flood LSAs within the Node Area 20, and use received LSAs to update its topology database and forwarding table(s), in accordance with conventional OSPF. With this arrangement, each IU 28 can update its respective topology database to reflect the current topology of the node 26, and to update its forwarding table with explicit routes to addresses within the node 26. The forwarding table may also be configured with a default route to the host ABR 24 for all "unknown" addresses (that is, addresses for which an explicit route is not defined in the forwarding table).

Host ABR 24, may operate in accordance with conventional OSPF protocols, treating the Node Area 20 as an OSPF area hosted by the host ABR 24, and treating the Link Area 22 as a virtual back-bone area through which summary LSAs may be sent and received. Thus, for example, the host ABR 24 may operate to generate summary LSAs containing (or updating) a digest of addresses reachable in the Node Area 20, and forward these summary LSAs through the Link Area 22 to remote ABR 32.

Remote ABR 32 may operate in a manner similar to that of host ABR 24, but in this case treating a connected OSPF area (not shown in FIG. 2) as its hosted OSPF area. Thus, remote ABR 32 may operate to generate summary LSAs containing (or updating) a digest of addresses reachable in the connected adjacent area, and forward these summary LSAs through the Link Area 22 to host ABR 24. Upon receipt of the summary LSA, host ABR 24 can update its forwarding database with summary route information for addresses reachable through the link 30.

In some embodiments, host ABR 24 may also forward received summary LSAs to any other ABRs connected to its Node Area 20. This enables each of these other ABRs to obtain summary information of addresses that may be reached through the Node Area 20 via the host ABR 24.

In some embodiments, the Remote ABR 32 may not forward summary LSAs through the Link Area 22 to host ABR 24. Instead, one or more provisioned routes may be manually installed in host ABR 24 so that host ABR 24 has visibility to addresses reachable in the connected adjacent area, via the Link Area 22.

Figure 2B:
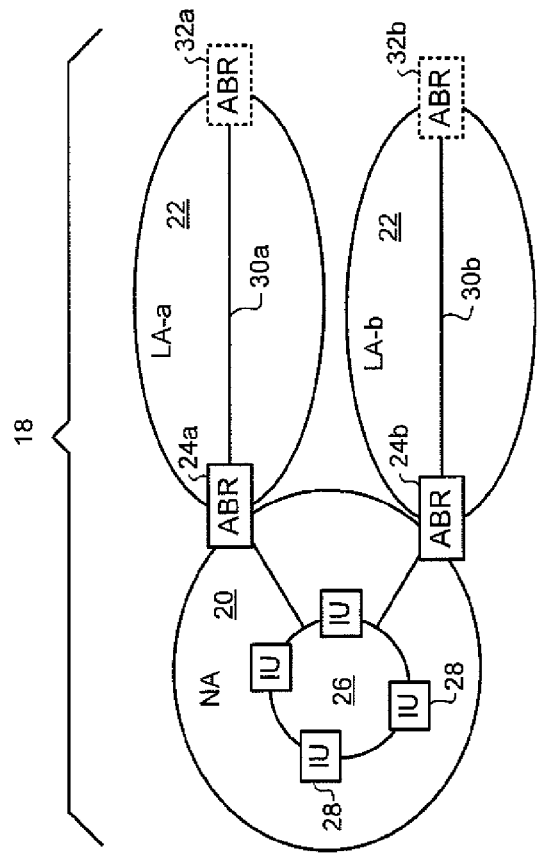

Preferably, a network segment template 18 comprises only one Node Area 20, which encompasses only one node 26. However, the template 18 may be constructed with any desired number of Link Areas 22, each of which encompasses a single link to a respective one adjacent node of the network. For example, FIG. 2b illustrates an embodiment in which the template 18 comprises a pair of Link Areas 22, each of which is connected to the Node Area 20 via a respective host ABR 24, and encompasses a respective link 30.

Figure 3A:
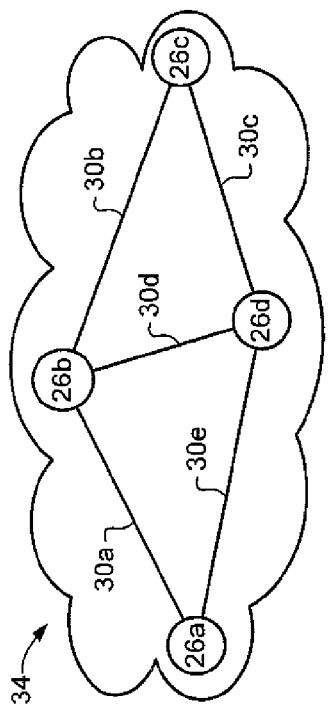
FIGS. 3a and 3b schematically illustrate an OSPF routing network associated with a transport network, in accordance with a representative embodiment of the present invention.
Figure 3B:
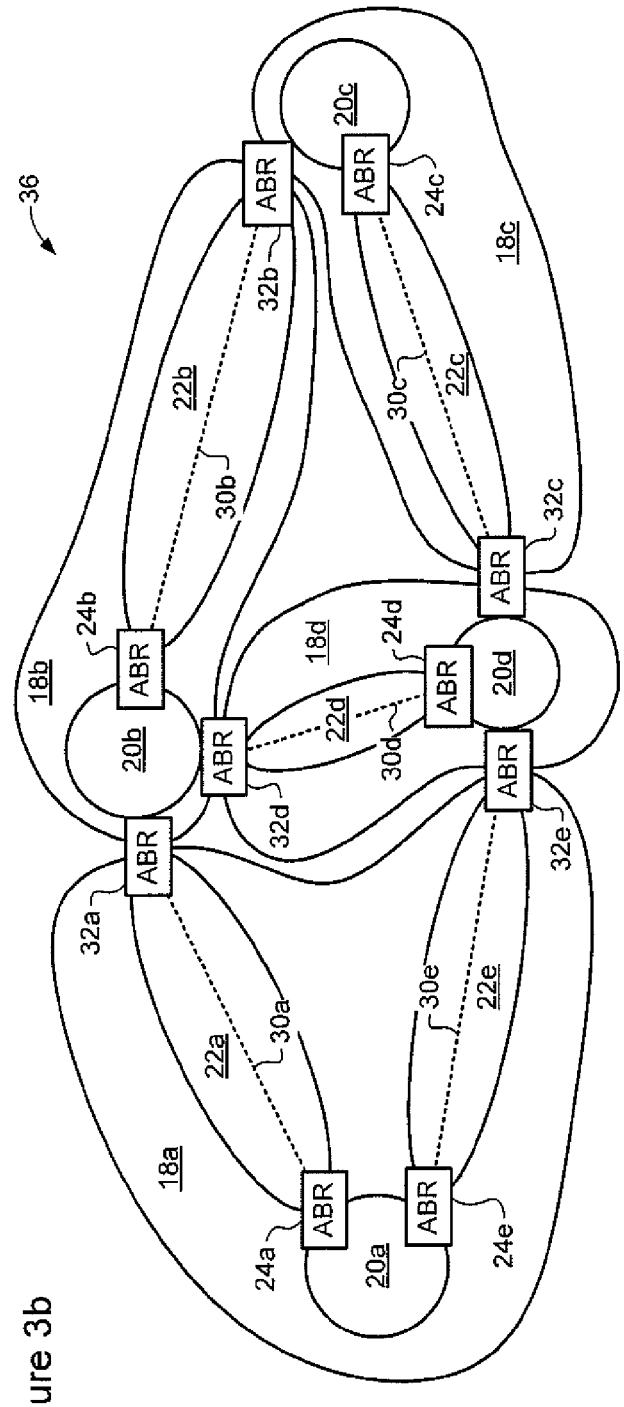

As noted above, the network segment template 18 encompasses a single node 26 and one or more attached links 30 to an adjacent nodes of the network. Accordingly, a highly scalable routing network can be deployed by instantiating a respective template 18 on each physical node+link segment of the network, and then connecting each template instance via remote ABRs 32 as required. This instantiation and linking of templates 18 can be performed on any physical network topology (including a full mesh topology, for example) to produce a routing network having a topology that closely follows that of the physical network. FIGS. 3a and 3b illustrate a scenario in which network segment templates 18 are instantiated to deploy a routing network in a mesh transport network.

Referring to FIG. 3a, a transport network 34 is shown which comprises four nodes 26a-d interconnected by links 30a-e in a partial mesh topology. The transport network 34 may, for example, be an optical communications network, in which each node 26 is a ROADM, and each link 30 is an optical fibre link comprising one or more fibre spans. In order to enable OSPF routing between addresses in the transport network 34, a routing network 36 is deployed by instantiating a respective network segment template 18 for each node+link segment of the transport network 34, and then interconnecting adjacent template instances via respective remote ADMs 32. FIG. 3b illustrates one possible routing network 36 constructed in this manner.

In the embodiment of FIG. 3b, a first template instance 18a comprises a Node Area 20a encompassing node 26a, and a pair of Link Areas 22a and 22e respectively encompassing links 30a and 30e. A second template instance 18b comprises a Node Area 20b encompassing node 26b, and a Link Area 22b encompassing link 30b. A third template instance 18c comprises a Node Area 20c encompassing node 26c, and a Link Area 22c encompassing link 30c. Finally, a fourth template instance 18d comprises a Node Area 20d encompassing node 26d, and a Link Area 22d encompassing link 30d. Each Link Area 22a-e is connected to the respective Node area 26 of an adjacent template instance 18 via a corresponding remote ABR 32a-e.

As may be appreciated, the exchange of summary LSAs through each Link Area 22a-e, means that each host ABR 24a-e and each remote ABR 32 can update its forwarding table with a digest of addresses reachable through its attached Link area 22. Thus for example, host ABR 24a can update its forwarding table with a digest of addresses in Node Area 20b, and remote ABR 32a can update its forwarding table with a digest of addresses in Node Area 20a. As may be appreciated, this means that the respective topology and forwarding databases of each ABR 24, 32 contains information regarding only a limited portion of the network. This limited OSPF routing visibility keeps the respective topology and forwarding databases of each ABR 24, 32 at a manageable size, independently of the size of the routing network 36. However, the portion of the network for which each ABR 24, 32 has OSPF routing visibility is still large enough that known route computation methods (such as, for example, Djykstra) may be used to compute end-to end routes between addresses in the transport network 34.

An advantage of the present invention is that the forwarding of summary LSAs by each of the ABRs ensures that summary route information can be exchanged between the ABRs within a flat network architecture, which eliminates the conventional hierarchal architecture of a backbone area linking ABRs within an Autonomous System, and a data network linking ASBRs of different Autonomous Systems. This flat architecture enables the routing network to scale with the transport network, and so easily accommodates network growth as nodes and links are added to the transport network. The flat architecture, in combination with the limited OSPF routing visibility of each ABR, also means that scaling limitations of OSPF (particularly relating to the number of ABRs that can be connected to a backbone area in an AS) and BGP (relating to the number of ASBRs that can communicate through the data network) are eliminated, so that a routing network constructed in accordance with the present invention can scale to a very large size.

A further advantage of the present invention is that the it simplifies the task of modifying the routing network in response to changes in the topology of the transport network. Thus for example, a network service provider may choose to modify their transport network, for example by adding (or removing) nodes 26 and/or links 30, in response to changing traffic demand. These changes can be reflected in the routing network simply by adding (or removing) segment template instances, as required. In direct contrast to conventional OSPF routing schemes, there is no need to re-engineer the existing network to accommodate these changes.

Although the invention has been described with reference to certain specific embodiments, various modifications thereof will be apparent to those skilled in the art without departing from the spirit and scope of the invention as defined in the claims appended hereto. The entire disclosures of all references recited above are incorporated herein by reference.

What is claimed is:

1. A method for enabling Open Shortest Path First (OSPF) routing in a transport network, the method comprising:
    defining a network segment template comprising:
        a node area encompassing a single network node, the node area defining OSPF routing between addresses within the network node;
        a link area encompassing a single link extending from the network node to a neighbour node in the transport network, the neighbour node being topologically adjacent to the network node in the transport network, the link area defining OSPF routing between the network node and the neighbour node; and
        a host Area Border Router (ABR) defining OSPF routing between the node area and the area, the host ABR being configured to generate summary Link State Advertisement (LSA) messages containing a summary of addresses in the node area, and forward the summary LSA messages through the link area to the neighbor node;
    instantiating a respective instance of the network segment template for each node+link segment of the transport network; and
    for each network segment template instance, instantiating a respective remote ABR defining OSPF forwarding between the link area and the respective node area of an adjacent network segment template instance, the remote ABR being configured to generate summary LSA messages containing a summary of addresses reachable in the node area of the adjacent template instance, and forward the summary LSAs through the link area of the network segment template instance.

2. The method as claimed in claim 1, wherein the network segment template comprises a single node area, and a single link area.

3. The method as claimed in f claim 1, wherein the network segment template comprises a single node area, and two or more link areas, each link area being connected to the node area via a respective host ABR.

4. The method as claim 1, wherein each remote ABR is incorporated into a respective network segment template.

5. The method as claimed in claim 1, wherein each remote ABR is not part of any network segment template, and is instantiated at a time that a first network segment template instance is connected to a second network segment template instance.

6. The method as claimed in f claim 1, wherein the host ABR is configured to forward summary LSAs received from the remote ABR to the node area.

7. A system for OSPF routing between addresses in a transport network, the system comprising:
    a routing network comprising:
        a respective instance of a network segment template for each node+link segment of the transport network, each network segment template instance comprising:
            a node area encompassing a single network node, the node area defining OSPF routing between addresses within the network node;

a link area encompassing a single link extending from the network node to a neighbour node in the transport network, the neighbour node being topologically adjacent to the network node in the transport network, the link area defining OSPF routing between the network node and the neighbour node; and a host Area Border Router (ABR) defining, OSPF routing between the node area and the link area, the host ABR being configured to generate summary Link State Advertisement (LSA) messages containing a summary of addresses in the node area, and forward the summary LSA messages through the link area to the neighbor node; and for each network segment instance, a respective remote ABR instance defining OSPF forwarding between the link area and the respective node area of an adjacent network segment instance, the remote ABR being configured to generate summary LSA messages containing a summary of addresses reachable in the node area of the adjacent template instance, and forward the summary LSA messages through the link area of the network template instance.

8. The system as claimed in claim 7, wherein the network segment template comprises a single node area, and a single link area.

9. The system as claimed in claim 7, wherein the network segment template comprises a single node area, and two or more link areas, each link area being connected to the node area via a respective host ABR.

10. The system as claimed in claim 7, wherein each remote ABR is incorporated into a respective network segment template.

11. The system as claimed in claim 7, wherein each remote ABR is not part of any network segment template, and is instantiated at a time that a first network segment template instance is connected to a second network segment template instance.

12. The system as claimed in claim 7, wherein the host ABR is configured to forward summary LSAs received from the remote ABR to the node area.

* * * * *